US010179576B2

(12) United States Patent
Cahill et al.

(10) Patent No.: US 10,179,576 B2
(45) Date of Patent: Jan. 15, 2019

(54) BRAKE CONTROL SYSTEM WITH DISABLING FEATURES

(71) Applicant: Goodrich Corporation, Charlotte, NC (US)

(72) Inventors: Eric Daniel Cahill, Troy, OH (US); Thomas Fink, Tipp City, OH (US); Marc Georgin, Dayton, OH (US); Efrem Ayichew, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 50 days.

(21) Appl. No.: 15/490,605

(22) Filed: Apr. 18, 2017

(65) Prior Publication Data
US 2018/0297566 A1    Oct. 18, 2018

(51) Int. Cl.
| B60T 8/17 | (2006.01) |
|---|---|
| B60T 8/172 | (2006.01) |
| B60T 13/68 | (2006.01) |
| B60T 15/02 | (2006.01) |

(52) U.S. Cl.
CPC ............ B60T 8/1703 (2013.01); B60T 8/172 (2013.01); B60T 13/686 (2013.01); B60T 15/028 (2013.01)

(58) Field of Classification Search
CPC ...... B60T 8/1703; B60T 8/172; B60T 13/686; B60T 15/028
See application file for complete search history.

(56) References Cited

U.S. PATENT DOCUMENTS

| 4,021,080 A * | 5/1977 | Sapir ................... B60T 8/885 303/122.04 |
|---|---|---|
| 5,044,697 A | 9/1991 | Longyear et al. |
| 6,820,946 B2 | 11/2004 | Salamat et al. |
| 8,565,939 B2 | 10/2013 | Cahill |
| 9,199,615 B2 | 12/2015 | Cahill |
| 9,227,608 B2 | 1/2016 | Hill et al. |
| 2005/0225165 A1* | 10/2005 | Naik ................... B60T 8/321 303/20 |
| 2011/0127828 A1 | 6/2011 | Sorin et al. |
| 2011/0187180 A1 | 8/2011 | Frank |

* cited by examiner

*Primary Examiner* — Melanie Torres Williams
(74) *Attorney, Agent, or Firm* — Snell & Wilmer L.L.P.

(57) ABSTRACT

A brake system may comprise a controller, a vehicle management system (VMS) in communication with the controller, a valve in communication with the controller, and a tangible, non-transitory memory configured to communicate with the controller, the tangible, non-transitory memory having instructions stored thereon that, in response to execution by the controller, cause the controller to perform operations comprising determining, by the controller, that a first enable signal is received by the controller from the VMS, determining, by the controller, that a second enable signal is received by the controller from the VMS, and disabling, by the controller, the controller from control of the valve in response to the first enable signal and the second enable signal.

18 Claims, 5 Drawing Sheets

BRAKE CONTROL SYSTEM WITH DISABLING FEATURES

FIELD

The present disclosure relates to aircraft braking systems, and more specifically, to a system and method for brake control systems.

BACKGROUND

Aircraft brake systems may include shared resources controlled by various systems. For example, an aircraft brake system may include a valve assembly controlled by a vehicle management system (VMS) and a brake control unit (BCU). In an emergency scenario, such as one where the BCU fails, it may be desirable for other controllers or systems to take control of the operations performed by the failed BCU to help with reliable braking operations.

SUMMARY

A brake system is provided, in accordance with various embodiments. The brake system may comprise a controller, a vehicle management system (VMS), wherein the VMS is in communication with the controller, a valve in communication with the controller, and a tangible, non-transitory memory configured to communicate with the controller. The tangible, non-transitory memory may have instructions stored thereon that, in response to execution by the controller, cause the controller to perform operations comprising determining, by the controller, that a first enable signal is received by the controller from the VMS, and disabling, by the controller, the controller from control of the valve in response to the first enable signal.

In various embodiments, the instructions may cause the controller to perform further operations comprising determining, by the controller, that a second enable signal is received by the controller from the VMS, and disabling, by the controller, the controller from control of the valve in response to both the first enable signal and the second enable signal. The disabling of the controller may be performed by triggering a disable interrupt service routine (ISR) which prevents the controller from communicating with the valve. The disable ISR may place the controller into an infinite loop. The controller may be disabled from communicating with the valve in response to both the first enable signal and the second enable signal being lowered. The first enable signal and the second enable signal may be received via a first wire and a second wire, respectively, the first wire being coupled between the VMS and the controller and the second wire being coupled between the VMS and the controller. The valve may comprise a shutoff valve (SOV) and/or a servo valve (SV). The valve may meter hydraulic pressure to a brake system component.

A tangible, non-transitory memory is disclosed herein, in accordance with various embodiments. A tangible, non-transitory memory may be configured to communicate with a controller, the tangible, non-transitory memory having instructions stored thereon that, in response to execution by the controller, cause the controller to perform operations comprising determining, by the controller, that a first enable signal is received by the controller from a vehicle management system (VMS), and disabling, by the controller, the controller from control of a valve in response to the first enable signal. The instructions may cause the controller to perform further operations comprising determining, by the controller, that a second enable signal is received by the controller from the VMS, and disabling, by the controller, the controller from control of the valve in response to both the first enable signal and the second enable signal. The instructions may cause the controller to perform further operations comprising shutting off, by the controller, the valve before disabling the controller from control of the valve. The instructions may cause the controller to perform further operations comprising triggering, by the controller, a disable interrupt service routine (ISR). The disable ISR may place the controller in a loop. The instructions may cause the controller to perform further operations comprising, rebooting, by the controller, in response to at least one of the first enable signal or the second enable signal.

A brake system is provided, in accordance with various embodiments. The brake system may comprise a brake control unit (BCU) comprising a controller, a vehicle management system (VMS), wherein the VMS is in communication with the controller, a shutoff valve (SOV) in communication with the controller, a servo valve (SV) in communication with the controller, and a tangible, non-transitory memory configured to communicate with the controller, the tangible, non-transitory memory having instructions stored thereon that, in response to execution by the controller, cause the controller to perform operations comprising sending, by the VMS, a first enable signal to the controller, and sending, by the VMS, a second enable signal to the controller, wherein the BCU is disabled from control of the SOV and the SV in response to the first enable signal and the second enable signal.

In various embodiments, the sending the first enable signal and the sending the second enable signal may trigger a disable interrupt service routine (ISR) which prevents the BCU from communicating with the SOV and the SV. The disable ISR may place the controller into an infinite loop. The controller may be disabled from communicating with the SOV and the SV in response to both the first enable signal and the second enable signal being lowered. The first enable signal and the second enable signal may be received via a first wire and a second wire, respectively, the first wire being coupled between the VMS and the controller and the second wire being coupled between the VMS and the controller. The SOV may supply a hydraulic pressure to the SV and the SV meters the hydraulic pressure between the SOV and a brake system component.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
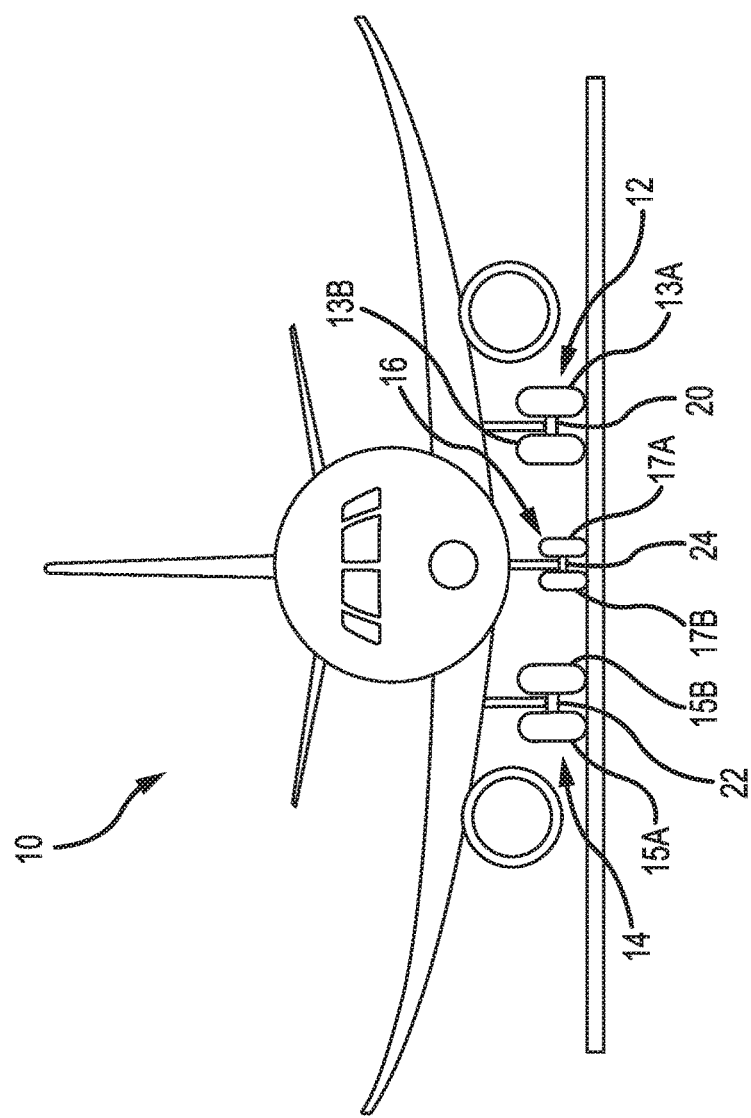
FIG. 1 illustrates an aircraft having landing gear, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

In the context of the present disclosure, systems and methods may find particular use in connection with aircraft wheel and brake control systems. However, various aspects of the disclosed embodiments may be adapted for optimized performance with a variety of components and in a variety of systems. As such, numerous applications of the present disclosure may be realized.

In various embodiments, aircraft brake systems may include a controller, such as a BCU controller for example. The controller may be configured to control the force commanded to the braking system. In hydraulic braking systems, force may be applied via hydraulic fluid pressure. The hydraulic system may include a shut off valve that supplies hydraulic fluid pressure to the braking system generally. A servo valve, downstream of the shut off valve, may supply hydraulic fluid pressure at other portions of the braking system.

As provided herein, a VMS may be in communication with the controller, such as a BCU. In various embodiments, it may be desirable for the VMS to take full control of the braking system, for example if the BCU fails. In this regard, a redundant system is provided herein to allow the VMS to disable the BCU from control of the brake system. The VMS may be hard-wired to an IB controller of the BCU via two separate wires and an OB controller of the BCU via two separate wires. Each wire may be assigned to an enable signal which may trigger a disable interrupt service routine (ISR). The disable ISR may be triggered only in response to both of the respective enable signals being activated. In this manner, the wires may each be individually tested without setting off the disable ISR. The disable ISR may place the BCU controller into a loop, preventing the controller from actuating the brake system.

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include wheel 13A and wheel 13B coupled by a strut 20; landing gear 14 may include wheel 15A and wheel 15B coupled by a strut 22; and landing gear 16 may include nose wheel 17A and nose wheel 17B coupled by a strut 24. Wheel 13A and wheel 15A may be referred to as outboard wheels. Wheel 13B and wheel 15B may be referred to as inboard wheels. The nose wheels differ from the main wheels in that the nose wheels may not include a brake.

Figure 2:
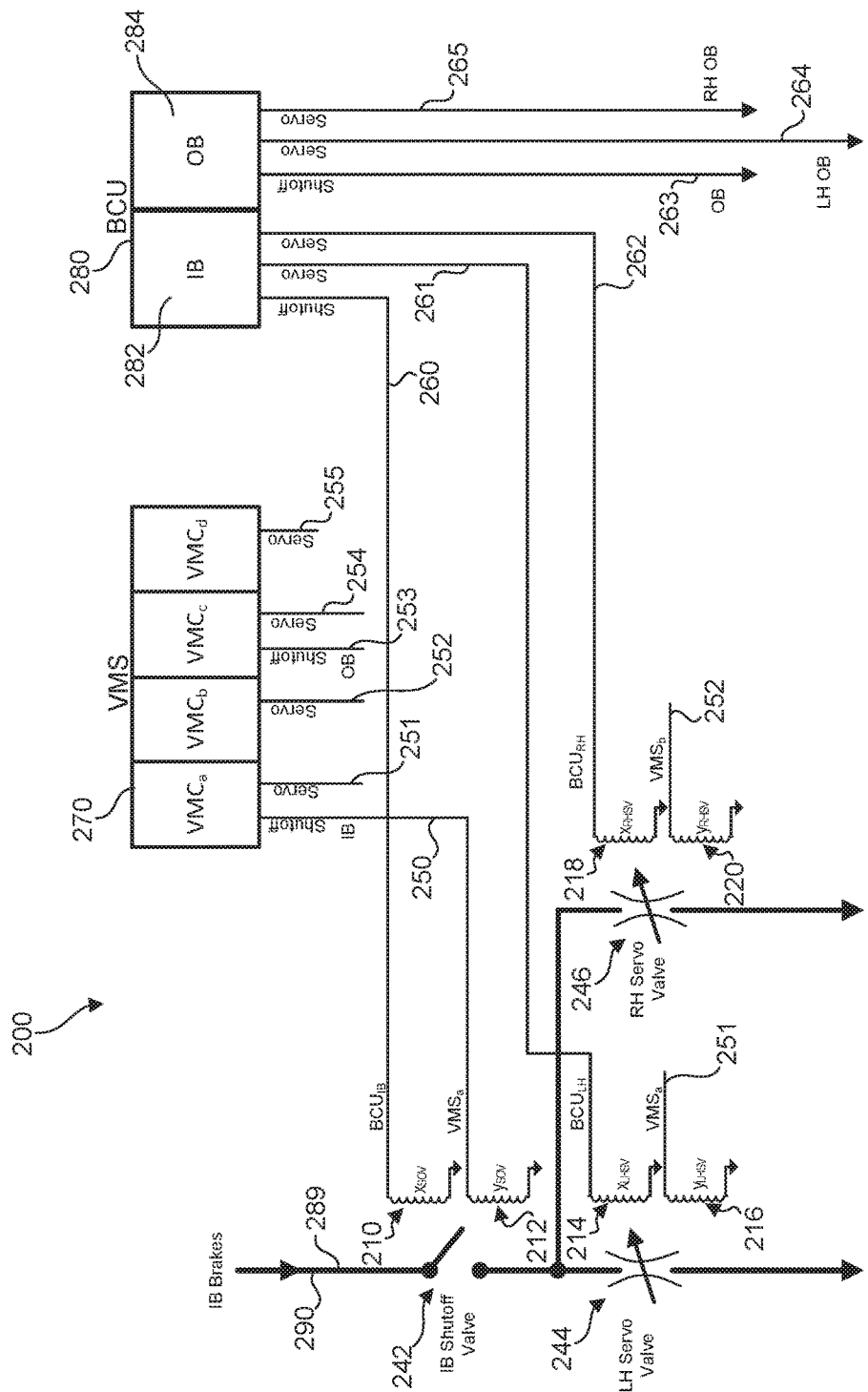
FIG. 2 illustrates a schematic view of a brake system, in accordance with various embodiments.

With reference to FIG. 2, a brake system (hereinafter "system 200") is illustrated. In various embodiments, system 200 may be implemented in the brake system of aircraft 10, with momentary reference to FIG. 1. System 200 may include a shut off valve (SOV) 242. SOV 242 of FIG. 2 is illustrated as an inboard (IB) shut off valve. However, SOV 242 may have also been illustrated as an outboard (OB) shut off valve or a shut off valve for both IB and OB control. SOV 242 may be supplied with pressurized hydraulic fluid 290 via conduit 289. SOV 242 may be in fluid communication with servo-valve (SV) 244 and servo-valve (SV) 246 via conduit 289. Although illustrated in FIG. 2 as a left-hand inboard servo valve, SV 244 may have also been illustrated as a left-hand (LH) outboard servo valve. Similarly, although illustrated in FIG. 2 as a right-hand (RH) inboard servo valve, SV 246 may have also been illustrated as a right-hand outboard servo valve. SOV 242 may be configured to supply SV 244 and SV 246 with pressurized hydraulic fluid in response to being in an open position. SV 244 and SV 246 may be configured to meter hydraulic fluid pressure between SOV 242 and various other brake system components via fluid conduit 289 as further described herein.

In various embodiments, the valves as discussed herein may be replaced with various types of valves known to a person having ordinary skill in the art.

System 200 may include brake controller 280. In various embodiments, brake controller 280 may be a controller and/or processor. In various embodiments, brake controller 280 may be implemented in a single controller and/or processor. In various embodiments, brake controller 280 may be implemented in multiple controllers and/or processors. In various embodiments, brake controller 280 may be implemented in a brake control unit (BCU). Brake controller 280 may be in electrical communication with SOV 242, SV 244, and/or SV 246. Brake controller 280 may comprise an IB brake controller 282 and an OB brake controller. IB brake controller 282 may control an inboard system. OB brake controller 284 may control an outboard system.

System 200 may include a vehicle management system (VMS) 270. VMS 270 may be a system whereby a vehicle may be operated (e.g., take flight) and controlled. VMS 270 may be a system whereby a vehicle may be operated remotely, without a human aboard the vehicle to operate the vehicle. VMS 270 may be a system whereby a vehicle may be operated locally, with a human aboard the vehicle to operate the vehicle. In various embodiments, VMS 270 may be a controller and/or processor. In various embodiments, VMS 270 may be implemented in a single controller and/or processor. In various embodiments, VMS 270 may be implemented in multiple controllers and/or processors.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

In various embodiments, VMS 270 may comprise a plurality of vehicle management controllers (VMCs). Each VMC may control a separate servo valve. For example, $VMC_a$ may be assigned to SV 244, $VMC_b$ may be assigned to SV 246, etc.

In various embodiments, SOV 242 may be controlled via a first coil (also referred to herein as a first SOV coil) 210 and a second coil (also referred to herein as a second SOV coil) 212. First coil 210 may be controlled by brake controller 280. In this regard, brake controller 280 may send a voltage signal 260 to first coil 210 to control the state of SOV 242. Second coil 212 may be controlled by VMS 270. In this regard, VMS 270 may send a voltage signal 250 to second coil 212 to control the state of SOV 242. In various embodiments, voltage signal 250 and/or voltage signal 260 may comprise a voltage of between zero and twenty-eight volts (0-28 $V_{DC}$). However, voltage signal 250 and/or voltage signal 260 may comprise any suitable voltage.

In various embodiments, SV 244 may be controlled via a first coil (also referred to herein as a first SV coil) 214 and a second coil (also referred to herein as a second SV coil) 216. First coil 214 may be controlled by brake controller 280. In this regard, brake controller 280 may send a current signal 261 to first coil 214 to control the position of SV 244. Second coil 216 may be controlled by VMS 270. In this regard, VMS 270 may send a current signal 251 to second coil 216 to control the position of SV 244.

In various embodiments, SV 246 may be controlled via a first coil (also referred to herein as a first SV coil) 218 and a second coil (also referred to herein as a second SV coil) 220. First coil 218 may be controlled by brake controller 280. In this regard, brake controller 280 may send a current signal 262 to first coil 218 to control the position of SV 246. Second coil 220 may be controlled by VMS 270. In this regard, VMS 270 may send a current signal 252 to second coil 220 to control the position of SV 246. In this manner, VMS and BCU provide redundant control to SOV 242, SV 244, and SV 246.

In various embodiments, current signal 251, current signal 261, current signal 252, and/or current signal 262 may comprise a current of between zero and thirty milliamps (0-30 mA). However, current signal 251, current signal 261, current signal 252, and/or current signal 262 may comprise any suitable current.

It should be appreciated that brake controller 280 may similarly control an SOV, a LH SV, and a RH SV on an outboard system via voltage signal 263, current signal 264, and current signal 265. Furthermore, it should be appreciated that VMS 270 may similarly control an SOV, a LH SV, and a RH SV on an outboard system via voltage signal 253, current signal 254, and current signal 255.

Figure 3:
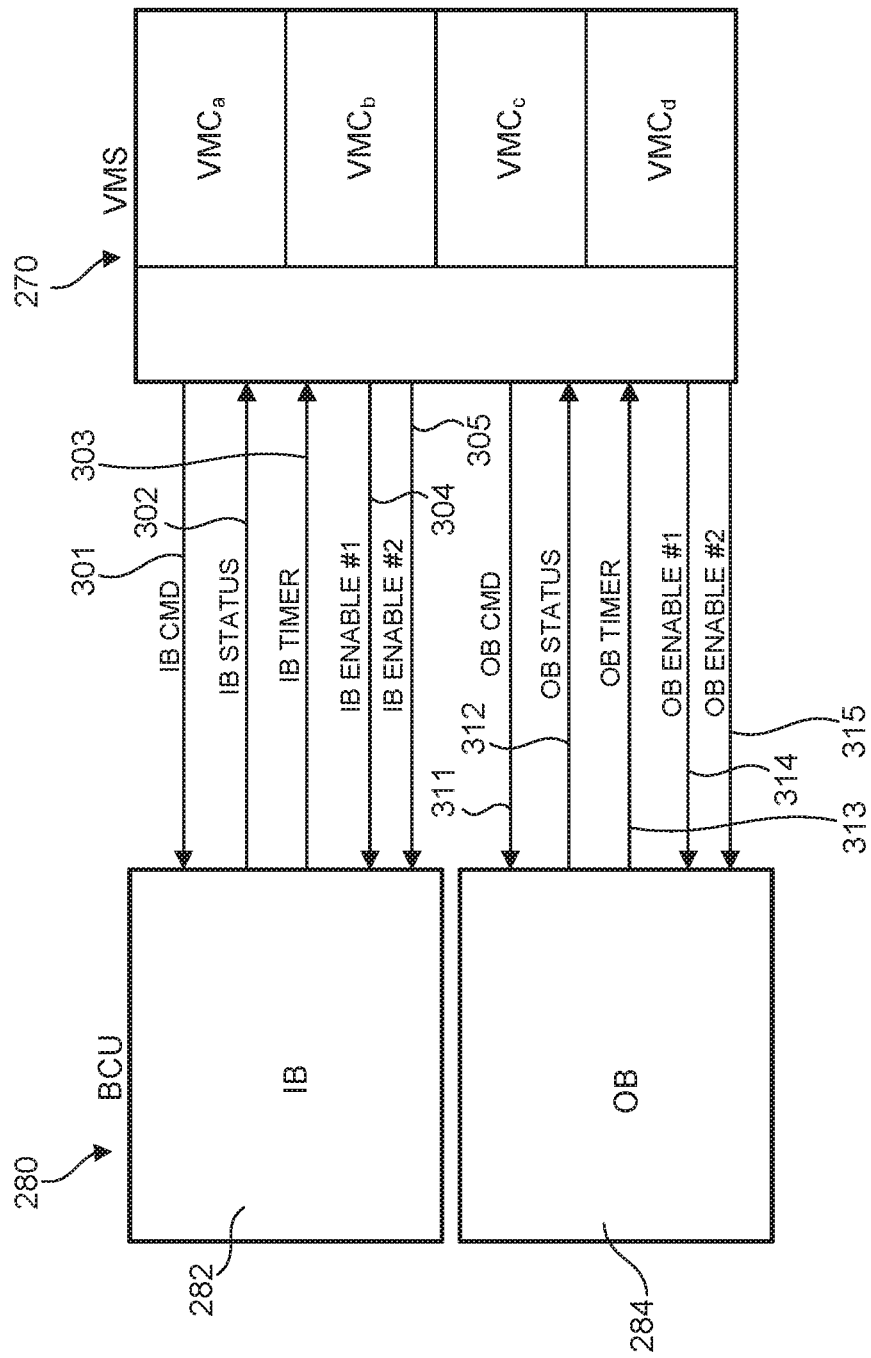
FIG. 3 illustrates a schematic view of a vehicle management system (VMS) in communication with a brake control unit (BCU), in accordance with various embodiments.

With reference to FIG. 3, elements with like element numbering as depicted in FIG. 2, are intended to be the same and will not necessarily be repeated for the sake of clarity.

With reference to FIG. 3, a schematic view of the communication lines between brake controller 280 and VMS 270 are illustrated, in accordance with various embodiments. In various embodiments, VMS 270 may send an IB command 301 to IB brake controller 282. IB command 301 may comprise various commands such as braking commands including park commands, deceleration commands, emergency braking commands, or any other suitable command.

In various embodiments, IB brake controller 282 may send an IB status 302 to VMS 270. IB brake controller 282 may report the status of IB brake controller 282 to VMS 270 via IB Status 302. For example, IB brake controller 282 may use IB status 302 to report to VMS 270 that IB brake controller 282 is performing the commands received via IB command 301.

In various embodiments, IB brake controller 282 may send an IB timer 303 to VMS 270. IB brake controller 282 may utilize IB timer 303 to report the status of an operation being performed by IB brake controller 282 to VMS 270.

In various embodiments, VMS 270 may send a first IB enable signal 304 to IB brake controller 282. VMS 270 may send a second IB enable signal 305 to IB brake controller 282. First IB enable signal 304 and second IB enable signal 305 may be used to enable an interrupt service routine (ISR) in IB brake controller 282, as described with further detail herein.

In various embodiments, VMS 270 and OB brake controller 284 may communicate in a similar manner as described above with reference to IB brake controller 282. In this regard, OB command 311, OB status 312, OB timer 313, first OB enable 314, and second OB enable 315, may be similar to IB command 301, IB status 302, IB timer 303, first IB enable 304, and second IB enable 305, respectively.

Figure 4:
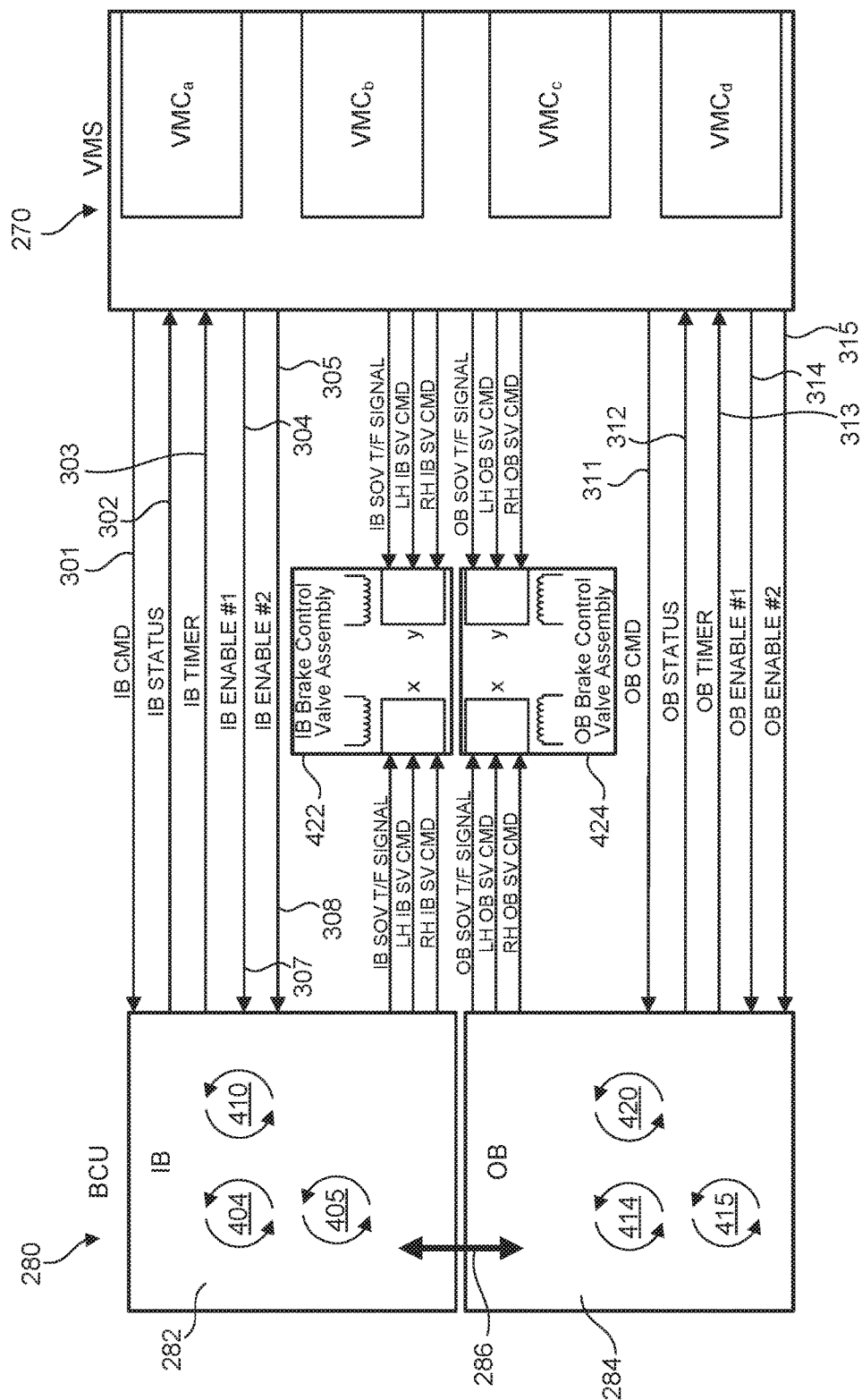
FIG. 4 illustrates a schematic view of the VMS in communication with the BCU and the VMS and BCU in communication with an inboard (IB) brake control valve assembly and an outboard (OB) brake control valve assembly, in accordance with various embodiments.

With respect to FIG. 4, elements with like element numbering as depicted in FIG. 3, are intended to be the same and will not necessarily be repeated for the sake of clarity.

With reference to FIG. 4, first IB enable 304 may comprise a signal, such as a voltage signal for example, to IB brake controller 282. ISR 404 may periodically check for first IB enable 304. Second IB enable 305 may comprise a signal, such as a voltage signal for example, to IB brake controller 282. ISR 405 may periodically check for second IB enable 305. In response to both first IB enable 304 and second IB enable 305 being lowered (e.g., a voltage signal lowered from a non-zero value to zero) IB disable ISR 410 may be triggered.

In various embodiments, IB disable ISR 410 may disable IB brake controller 282 from control of IB brake control valve assembly 422. IB brake control valve assembly 422 may include SOV 242, SV 244, and SV 246 of FIG. 2. In this regard, VMS 270 may lower first IB enable 304 and second IB enable 305 to disable IB brake controller 282 to take full control of IB brake control valve assembly 422. In response to IB disable ISR 410 being triggered, IB brake controller 282 may enter an infinite loop whereby IB brake controller 282 may not exit unless IB brake controller 282 is hard re-booted (e.g., power is cycled to IB brake controller 282). In response to IB disable ISR 410 being triggered, IB brake controller 282 may enter a finite loop whereby IB brake controller 282 may not exit unless first IB enable 304 and/or second IB enable 305 is raised (e.g., from zero to a non-zero value).

IB brake controller 282 may comprise a non-transitory memory. ISR 404, ISR 405, and/or IB disable ISR 410 may comprise instructions stored in memory. OB brake controller 284 may comprise a non-transitory memory. ISR 414, ISR 415, and/or OB disable ISR 420 may comprise instructions stored in memory Similarly, ISR 414 and ISR 415 may monitor first OB enable 314 and second OB enable 315, respectively to trigger OB disable ISR 420. OB disable ISR 420 may disable OB brake controller 284 from control of OB brake control valve assembly 424.

An intercommunication bus 286 may allow IB brake controller 282 to communication with OB brake controller 284.

Figure 5:
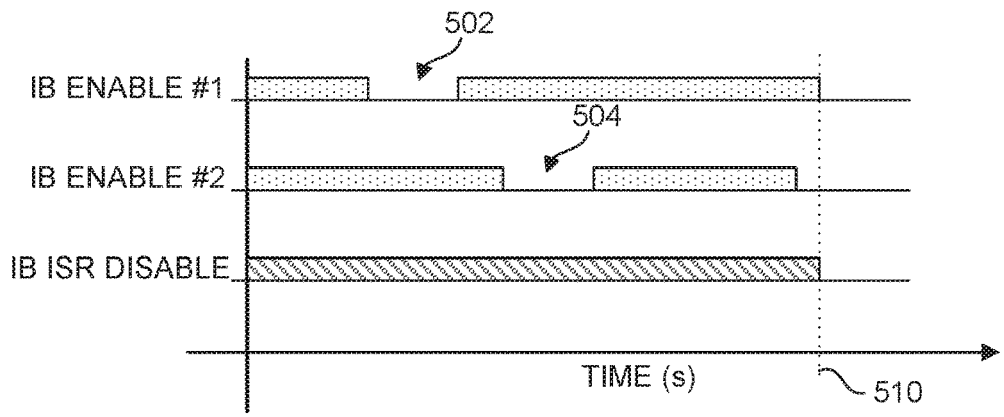
FIG. 5 illustrates an exemplary built in test (BIT) and arbitration scheme for a first IB enable signal, a second IB enable signal, and an IB disable interrupt service routine (ISR), in accordance with various embodiments.

With combined reference to FIG. 5, an exemplary built in test (BIT) and arbitration scheme for first IB enable 304, second IB enable 305, and IB disable ISR 410 is illustrated, in accordance with various embodiments. By providing two IB enable "switches" (i.e., first IB enable 304 and second IB enable 305), each line may be tested independently without triggering IB disable ISR 410. For example, at location 502, first IB enable 304 is lowered from a non-zero value to a zero value to test the integrity of first enable 304. IB brake controller 282 may echo a response to VMS 270 to indicate that IB brake controller 282 recognized the first IB enable 304 signal test. Similarly, at location 504, second IB enable 305 is lowered from a non-zero value to a zero value to test the integrity of second IB enable 305. IB brake controller 282 may echo a response to VMS 270 to indicate that IB brake controller 282 recognized the second IB enable 305 signal test. IB disable ISR 410 may not be triggered unless both first IB enable 304 and second IB enable 305 are lowered, as depicted at time 510. It is contemplated herein that IB disable ISR 410 may be triggered in response to both signals of first IB enable 304 and second IB enable 305 being raised instead of lowered as illustrated in FIG. 5. Furthermore, it is contemplated herein, that a single IB enable line may be used instead of having two IB enable lines (i.e., first IB enable 304 and second IB enable 305). First IB enable 304 and second IB enable 305 may comprise hard lines between VMS 270 and IB brake controller 282 (e.g., copper wires or the like). For example, first IB enable 304 and second IB enable 305 may be received by a first wire 307 and a second wire 308, respectively, coupled between VMS 270 and IB brake controller 282.

With reference again to FIG. 4, in response to being triggered, IB disable ISR 410 may be configured to perform various operations before entering the finite or infinite loop. For example, with momentary reference to FIG. 2, IB disable ISR 410 may turn off SOV 242, set SV 244 and SV 246 to zero, and/or any other suitable operation which may be desirable before disabling the IB brake controller 282.

Figure 6:
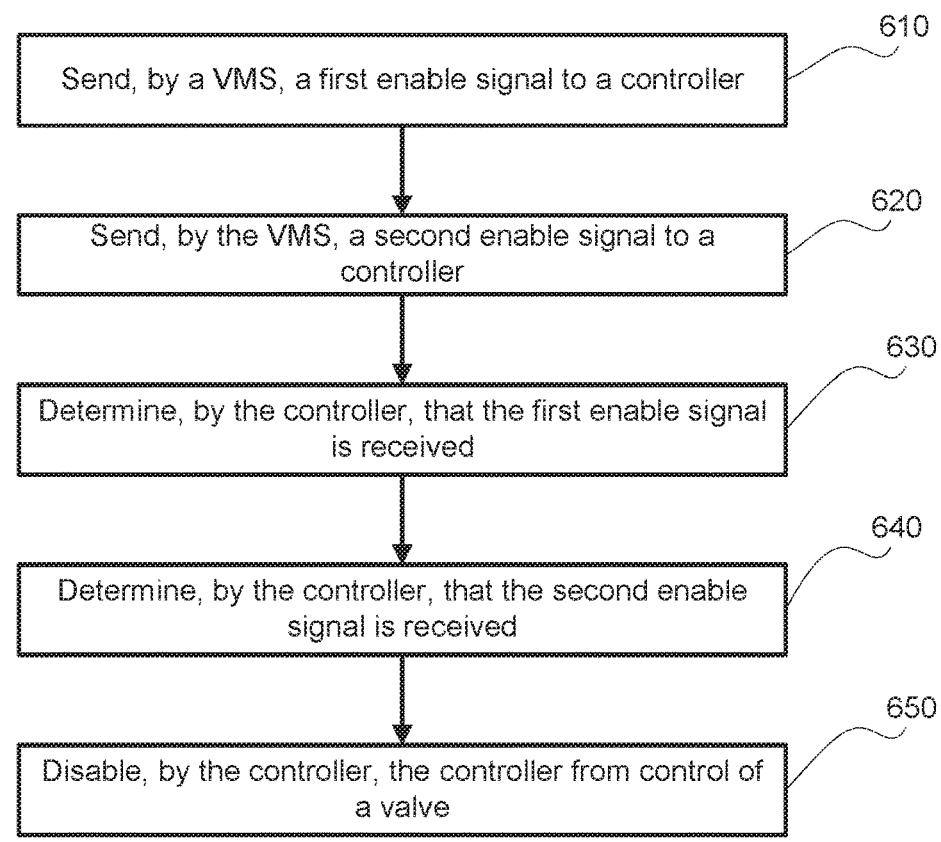
FIG. 6 illustrates a method for brake control, in accordance with various embodiments.

With reference to FIG. 6, a method 600 for brake control is illustrated, in accordance with various embodiments. Method 600 includes sending, by a VMS, a first enable signal to a controller (step 610). Method 600 includes sending, by the VMS, a second enable signal to a controller (step 620). Method 600 includes determining, by a controller, that the first enable signal is received by the controller (step 630). Method 600 determining, by the controller, that the second enable signal is received by the controller (step 640). Method 600 includes disabling, by the controller, the controller from control of a valve (step 650).

With combined reference to FIG. 4 and FIG. 6, step 610 may include sending, by VMS 270, first IB enable signal 304 to IB brake controller 282. Step 610 may include sending, by VMS 270, first OB enable signal 314 to OB brake controller 284. Step 620 may include sending, by VMS 270, second IB enable signal 305 to IB brake controller 282. Step 620 may include sending, by VMS 270, second OB enable signal 315 to OB brake controller 284. Step 630 may include determining, by IB brake controller 282, that first IB enable signal 304 is received by IB brake controller 282 from VMS 270. Step 630 may include determining, by OB brake controller 284, that first OB enable signal 314 is received by OB brake controller 284 from VMS 270. Step 640 may include determining, by IB brake controller 282, that second IB enable signal 305 is received by IB brake controller 282 from VMS 270. Step 640 may include determining, by OB brake controller 284, that second OB enable signal 315 is received by OB brake controller 284 from VMS 270. Step 650 may include disabling, by IB brake controller 282, IB brake controller 282 from control of IB brake control valve assembly 422. Step 650 may include disabling, by OB brake controller 284, OB brake controller 284 from control of OB brake control valve assembly 424.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake system, comprising:
   a controller;
   a vehicle management system (VMS), wherein the VMS is in communication with the controller;
   a valve in communication with the controller; and
   a tangible, non-transitory memory configured to communicate with the controller, the tangible, non-transitory memory having instructions stored thereon that, in response to execution by the controller, cause the controller to perform operations comprising:
      determining, by the controller, that a first enable signal is received by the controller from the VMS;
      determining, by the controller, that a second enable signal is received by the controller from the VMS; and
      disabling, by the controller, the controller from control of the valve in response to the first enable signal and the second enable signal.

2. The brake system of claim 1, wherein the disabling of the controller is performed by triggering a disable interrupt service routine (ISR) which prevents the controller from communicating with the valve.

3. The brake system of claim 2, wherein the disable ISR places the controller into an infinite loop.

4. The brake system of claim 1, wherein the controller is disabled from communicating with the valve in response to both the first enable signal and the second enable signal being lowered.

5. The brake system of claim 4, wherein the first enable signal and the second enable signal are received via a first wire and a second wire, respectively, the first wire being coupled between the VMS and the controller and the second wire being coupled between the VMS and the controller.

6. The brake system of claim 1, wherein the valve comprises at least one of a shutoff valve (SOV) or a servo valve (SV).

7. The brake system of claim 6, wherein the valve meters hydraulic pressure to a brake system component.

8. A tangible, non-transitory memory configured to communicate with a controller, the tangible, non-transitory memory having instructions stored thereon that, in response to execution by the controller, cause the controller to perform operations comprising:
   determining, by the controller, that a first enable signal is received by the controller from a vehicle management system (VMS);
   determining, by the controller, that a second enable signal is received by the controller from the VMS; and
   disabling, by the controller, the controller from control of a valve in response to the first enable signal and the second enable signal.

9. The tangible, non-transitory memory of claim 8, wherein the instructions cause the controller to perform further operations comprising:
   shutting off, by the controller, the valve before disabling the controller from control of the valve.

10. The tangible, non-transitory memory of claim 8, wherein the instructions cause the controller to perform further operations comprising:
    triggering, by the controller, a disable interrupt service routine (ISR).

11. The tangible, non-transitory memory of claim 10, wherein the disable ISR places the controller in a loop.

12. The tangible, non-transitory memory of claim 11, wherein the instructions cause the controller to perform further operations comprising:
    rebooting, by the controller, in response to at least one of the first enable signal or the second enable signal.

13. A brake system, comprising:
    a brake control unit (BCU) comprising a controller;
    a vehicle management system (VMS), wherein the VMS is in communication with the controller;
    a shutoff valve (SOV) in communication with the controller;
    a servo valve (SV) in communication with the controller; and
    a tangible, non-transitory memory configured to communicate with the controller, the tangible, non-transitory memory having instructions stored thereon that, in response to execution by the controller, cause the controller to perform operations comprising:
       sending, by the VMS, a first enable signal to the controller; and
       sending, by the VMS, a second enable signal to the controller;
       wherein the BCU is disabled from control of the SOV and the SV in response to the first enable signal and the second enable signal.

14. The brake system of claim 13, wherein the sending the first enable signal and the sending the second enable signal triggers a disable interrupt service routine (ISR) which prevents the BCU from communicating with the SOV and the SV.

15. The brake system of claim 14, wherein the disable ISR places the controller into an infinite loop.

16. The brake system of claim 15, wherein the controller is disabled from communicating with the SOV and the SV in response to both the first enable signal and the second enable signal being lowered.

17. The brake system of claim 16, wherein the first enable signal and the second enable signal are received via a first wire and a second wire, respectively, the first wire being coupled between the VMS and the controller and the second wire being coupled between the VMS and the controller.

18. The brake system of claim 17, wherein the SOV supplies a hydraulic pressure to the SV and the SV meters the hydraulic pressure between the SOV and a brake system component.

* * * * *